United States Patent [19]

Homan et al.

[11] 4,070,328
[45] Jan. 24, 1978

[54] MERCAPTOORGANOPOLYSILOXANES CURED TO ELASTOMERS WITH PEROXIDES AND NITROGEN COMPOUNDS

[75] Inventors: Gary R. Homan; Chi-Long Lee, both of Midland, Mich.

[73] Assignee: Dow Corning Corporation, Midland, Mich.

[21] Appl. No.: 756,295

[22] Filed: Jan. 3, 1977

[51] Int. Cl.$^2$ .............................................. C08L 83/08
[52] U.S. Cl. .......................... 260/37 SB; 260/46.5 E; 260/46.5 G
[58] Field of Search .......... 260/37 SB, 45.7 E, 45.7 G

[56] References Cited

U.S. PATENT DOCUMENTS

| 3,382,196 | 5/1968 | Gowdy et al. | 260/46.5 E X |
| 3,873,499 | 3/1975 | Michael et al. | 260/46.5 G X |
| 3,925,331 | 12/1975 | Ely | 260/46.5 E X |

*Primary Examiner*—Lewis T. Jacobs
*Attorney, Agent, or Firm*—Roger H. Borrousch

[57] ABSTRACT

Mixing mercaptoorganopolysiloxanes, organic hydroperoxide, a nitrogen compound, such as cyclohexylamine, piperidine or triethylamine and optionally a filler provides a composition which cures to an elastomer at room temperature. The elastomers have tack free surfaces and are useful as sealants and rubber articles.

4 Claims, No Drawings

MERCAPTOORGANOPOLYSILOXANES CURED TO ELASTOMERS WITH PEROXIDES AND NITROGEN COMPOUNDS

BACKGROUND OF THE INVENTION

1. Field of the Invention

This invention relates to elastomers prepared from mercaptoorganopolysiloxanes.

2. Description of the Prior Art

Compositions containing mercapto functional siloxanes and aliphatically unsaturated organosiloxanes have been described in the prior art, such as in U.S. Pat. No. 3,816,282, in German Patent Publication (OLS) Number 2,008,426 and by George A. Gant in U.S. patent application Ser. No. 401,791, filed Sept. 28, 1973, entitled "UV Curable Compositions" and assigned to the same assignee as the present application. Other mercapto functional silanes and siloxanes have been described as priming agents, corrosion resistant coatings, such as for silver, and for surface treatments of various substrates. However, mercaptoorganopolysiloxanes have not been suggested as elastomer forming materials by themselves.

SUMMARY OF THE INVENTION

This invention relates to compositions which are curable to elastomers at room temperature where the compositions comprise a mercaptoorganopolysiloxane having no more than 10 mol percent —SH containing siloxane units and an average of more than two sulfur atoms per molecule and at least 10 siloxane units per molecule, organic hydroperoxide, a nitrogen compound selected from the group of N,N'-tetramethylguanidine, piperidine, cyclohexylamine and triethylamine and optionally a filler.

The compositions can be used as sealants which rapidly cure to elastomers with non-tacky surfaces and which do not have some of the inhibitions of conventional peroxide cured silicone elastomers or the compositions which are cured with SiH containing siloxanes and platinum catalyst.

DESCRIPTION OF THE INVENTION

This invention relates to a composition curable to an elastomer comprising a material prepared by mixing (A) a mercaptoorganopolysiloxane consisting essentially of a combination of units selected from dimethylsiloxane units, trimethylsiloxane units, units of the formula

units of the formula

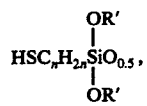

units of the formula

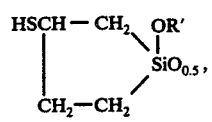

units of the formula

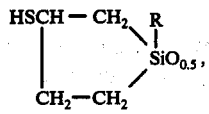

units of the formula

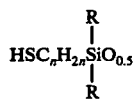

and units of the formula

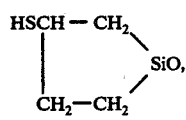

wherein R is a monovalent radical selected from the group consisting of alkyl radicals of from 1 to 3 carbon atoms inclusive and phenyl radicals, R' is methyl or ethyl and $n$ has a value of from 1 to 4 inclusive, there being in said mercaptoorganopolysiloxane an average of more than two sulfur containing siloxane units per molecule and no more than 10 mol percent —SH containing siloxane units based on the total number of siloxane units in the mercaptoorganopolysiloxane, there being at least 10 siloxane units per molecule in said mercaptoorganopolysiloxane, (B) organic hydroperoxide in an amount of from 1 to 6 parts by weight based on 100 parts by weight of (A), (C) a nitrogen compound selected from the group consisting of N,N'-tetramethylguanidine, piperidine, cyclohexylamine and triethylamine in amounts of 0.05 to 1 part by weight based on 100 parts by weight of (A), and (D) a filler in an amount of from 0 to 100 parts by weight per 100 parts by weight of (A).

The compositions of the present invention are prepared by mixing the ingredients (A), (B), (C) and (D). The resulting mixtures undergo a curing reaction as soon as they are mixed. Inasmuch as, crosslinking reaction begins upon mixing, the combination of (A), (B), (C) and (D) should not be prepared in advance of the time cure is desired. For purposes of storage, the compositions of this invention are two component or two package compositions. One can combine (A) and optionally (D) for one package and (B) and (C) as a second package. Various combinations can be used for purposes of storage, however, it is cautioned that the combination of (A) and (B) may result in gelation of that mixture on storage.

Preferably, (A), (B), (C) and (D) are mixed at a temperature below 50° C. so that one does not activate the peroxide prematurally and cause gelation or curing during the mixing procedure.

After (A), (B), (C) and (D) are mixed, the composition will cure at room temperature, above 20° C. Compositions are best cured in the presence of oxygen gas, such as air.

The type of mixing procedure is not critical as long as it does not generate excessive heating. Also the composition can be combined and mixed by using a multi-feed extruder wherein two or more components can be fed into a mixer and the composition is extruded from the apparatus. The resulting extruded article can be then left to cure at room temperature.

The mercaptoorganopolysiloxanes of (A) contain combinations of two or more of the following units: dimethylsiloxane units, trimethylsiloxane units, and units of the formulae

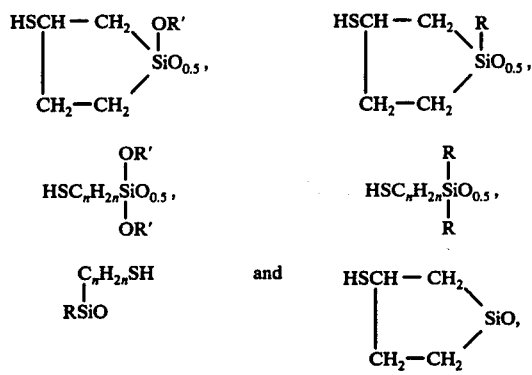

where R is an alkyl of 1 to 3 carbon atoms including methyl, ethyl and propyl, or phenyl, R' is methyl or ethyl and $n$ is 1 to 4 inclusive, preferably $n$ is 3 and R and R' are methyl. The mercaptoorganopolysiloxanes for use in the present invention are those which have an average of more than two sulfur atoms per molecule and no more than 8 mol percent —SH containing siloxane units based on the number of siloxane units in the mercaptoorganopolysiloxane, and at least 10 siloxane units per molecule. Preferably, the mercaptoorganopolysiloxanes have more than 20 siloxane units per molecule and no more than 3.5 weight percent —SH group and the most preferred are those with no more than 2.2 weight percent —SH group. The mercaptoorganopolysiloxanes are known in the art. The silacyclopentane mercapto siloxanes can be prepared by the method defined in U.S. Pat. No. 3,655,713 which is hereby incorporated by reference to show the silacyclopentane mercapto siloxanes and their preparation. The mercaptoorganosiloxanes which contain endblocking units of the formula

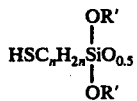

can be prepared by reacting a hydroxyl endblocked polydimethylsiloxane and a mercaptoalkyl trialkoxysilane of the formula

in the presence of solid potassium hydroxide or potassium silanolate catalysts. The potassium silanolate catalyst is preferred for the higher viscosity polydimethylsiloxanes. The mercaptoalkyltrialkoxysilane is preferably used in excess of about 10 weight percent over stoichiometric amounts. The resulting product is essentially a polydimethylsiloxane endblocked with the units of the formula

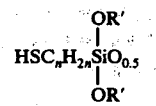

but there may be some small amounts of units wherein two SiOH groups have reacted with one mercaptoalkyltrialkoxysilane molecule, but these amounts are small enough that the character of the endblocked polydimethylsiloxane is not noticeably altered.

The organic hydroperoxide (B) can be any hydroperoxide, such as, tertiary butyl hydroperoxide, cumene hydroperoxide and para-menthane hydroperoxide.

The nitrogen compounds, (C), can be N,N'-tetramethylguanidine, piperidine, cyclohexylamine or triethylamine. These nitrogen compounds result in a rapid cure and the elastomer has a tack free or dry surface in a short time. Other nitrogen compounds may result in a cured elastomeric product but the surfaces are tacky, some such nitrogen compounds include diphenylquanidine, aniline, pyridine, ortho toluidine, and hexamethyldisilazane. The amount of (C) can be from 0.05 to 1 part by weight per 100 parts by weight of (A) and preferably from 0.05 to 0.5 part by weight per 100 parts by weight of (A).

Fillers are preferably used in the compositions of this invention, but are not required. The fillers can be both treated and untreated reinforcing fillers, such as fume silica and fume silica having triorganosiloxy groups, such as trimethylsiloxy groups on the surface, carbon black or precipitated silica, and extending fillers such as crushed or ground quartz, diatomaceous earth, and calcium carbonate.

The compositions of the present invention are made by mixing (A), (B) and (C) in weight ratios sufficient enough to provide from 1 to 6 parts by weight of peroxide per 100 parts by weight of (A) and from 0.05 to 1 part by weight of nitrogen compound per 100 parts by weight of (A). The compositions preferably contain filler up to 100 parts by weight per 100 parts by weight of (A).

The compositions of this invention cure to elastomers at room temperature. The resulting elastomer has a dry or non-tacky surface. Air inhibition which is observed with conventional non-mercapto-containing peroxide cured silicone rubber composition is not observed and the inhibition by various materials such as sulfur and phosphorus in the platinum catalyzed compositions containing aliphatic unsaturated siloxanes and SiH containing siloxanes, is not observed.

The following example is presented for illustrative purposes and should not be construed as limiting the invention which is properly delineated in the claims.

EXAMPLE 1

Sealant compositions were prepared by mixing 100 grams of a trimethylsiloxy endblocked polydiorganosiloxane having dimethylsiloxane units and gamma-mercaptopropylmethylsiloxane units, 0.49 weight percent —SH groups and a viscosity at 25° C. of 5.2 pascal·seconds, 30 grams of 5 micron crushed quartz, X grams of tertiary butyl hydroperoxide as shown in Table I and 0.1 gram of a nitrogen compound as shown in Table I. The sealant compositions were allowed to cure at room temperature and the snap time was determined by observing the length of time required for the composition to obtain recovery properties, and the length of time for the surface to become non-tacky or dry.

Table I

| Run No. | Nitrogen Compound | X, Grams | Snap Time | Non-Tack Time, Minutes |
|---|---|---|---|---|
| 1. | piperidine | 5 | <60 seconds | <3 |
| 2. | piperidine | 2 | 65 seconds | <3 |
| 3. | triethylamine | 2 | 10–12 minutes | 10–12 |
| 4. | N,N'-tetramethyl-guanidine | 2 | 45 seconds | 15 |
| 5. | cyclohexylamine | 2 | 50 seconds | 3 |

EXAMPLE 2

Sealant compositions were prepared by mixing 100 parts by weight of a trimethylsiloxy endblocked polydiorganosiloxane having dimethylsiloxane units and gamma-mercaptopropylmethylsiloxane units and 2.25 weight percent —SH groups, 0.5 part by weight amine as shown in Table II and 5.0 parts by weight of hydroperoxide as shown in Table II. The sealant compositions were allowed to cure at room temperature and the snap time was determined by observing the length of time required for the composition to obtain recovery properties, and the length of time for the surface to become non-tacky or dry.

Table II

| Run No. | Hydroperoxide | Amine | Snap Time | Non-Tack Time, Minutes |
|---|---|---|---|---|
| 1. | Cumene | triethylamine | 8 minutes | 45–55 |
| 2. | Cumene | piperidine | 1 minute | 3–5 |
| 3. | tertiary butyl | piperidine | 0.75 minute | 8–10 |
| 4. | para-menthane | piperidine | 2.5 minutes | 12–15 |
| 5. | cumene | none | 4 hours | 2 days |
| 6. | none | piperidine | >6 days | — |

That which is claimed is:

1. A composition curable to an elastomer comprising a material prepared by mixing
A. a mercaptoorganopolysiloxane consisting essentially of a combination of units selected from dimethylsiloxane units, trimethylsiloxane units, units of the formula

units of the formula

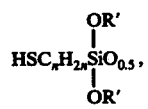

units of the formula

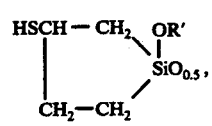

units of the formula

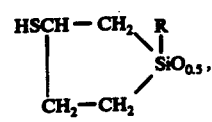

units of the formula

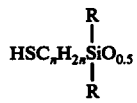

and units of the formula

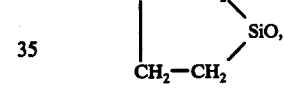

wherein R is a monovalent radical selected from the group consisting of alkyl radicals of from 1 to 3 carbon atoms inclusive and phenyl radicals, R' is methyl or ethyl and $n$ has a value of from 1 to 4 inclusive, there being in said mercaptoorganopolysiloxane an average of more than two sulfur containing siloxane units per molecule and no more than 10 mol percent —SH containing siloxane units based on the total number of siloxane units in the mercaptoorganopolysiloxane, there being at least 10 siloxane units per molecule in said mercaptoorganopolysiloxane,
B. organic hydroperoxide in an amount of from 1 to 6 parts by weight based on 100 parts by weight of (A),
C. a nitrogen compound selected from the group consisting of N,N'-tetramethylguanidine, piperidine, cyclohexylamine and triethylamine in amounts of 0.05 to 1 part by weight based on 100 parts by weight of (A), and
D. a filler in an amount of from 0 to 100 parts by weight per 100 parts by weight of (A).

2. The composition in accordance with claim 1 in which the organic hydroperoxide (B) is tertiary butyl hydroperoxide.

3. The composition in accordance with claim 1 in which the organic hydroperoxide (B) is cumene hydroperoxide.

4. The composition in accordance with claim 1 in which the organic hydroperoxide (B) is para-menthane hydroperoxide.

* * * * *